US009829566B2

(12) United States Patent
Rao et al.

(10) Patent No.: US 9,829,566 B2
(45) Date of Patent: Nov. 28, 2017

(54) CONTROLLING RADAR TRANSMISSION TO ENABLE INTERFERENCE MITIGATION

(71) Applicant: Texas Instruments Incorporated, Dallas, TX (US)

(72) Inventors: Sandeep Rao, Bangalore (IN); Karthik Subburaj, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 467 days.

(21) Appl. No.: 14/552,505

(22) Filed: Nov. 25, 2014

(65) Prior Publication Data

US 2016/0146933 A1 May 26, 2016

(51) Int. Cl.
| | |
|---|---|
| *G01S 7/02* | (2006.01) |
| *G01S 7/28* | (2006.01) |
| *G01S 13/58* | (2006.01) |
| *G01S 13/34* | (2006.01) |
| *G01S 13/38* | (2006.01) |
| *G01S 13/93* | (2006.01) |

(52) U.S. Cl.
CPC ............ *G01S 7/023* (2013.01); *G01S 7/28* (2013.01); *G01S 13/34* (2013.01); *G01S 13/38* (2013.01); *G01S 13/583* (2013.01); *G01S 13/931* (2013.01)

(58) Field of Classification Search
CPC ........ G01S 7/023; G01S 7/288; G01S 13/583; G01S 13/584; G01S 13/34; G01S 13/343; G01S 13/38; G01S 13/931
USPC ........................................................ 342/132
See application file for complete search history.

(56) References Cited

U.S. PATENT DOCUMENTS

| | | | | | |
|---|---|---|---|---|---|
| 5,861,836 | A | * | 1/1999 | Hoss ..................... | G01S 13/931 342/109 |
| 6,492,938 | B1 | * | 12/2002 | Alland .................... | G01S 7/354 342/118 |
| 2008/0100500 | A1 | * | 5/2008 | Kondoh .................... | G01S 7/35 342/109 |
| 2009/0121915 | A1 | * | 5/2009 | Randler ................ | G01S 13/345 342/70 |
| 2009/0201193 | A1 | * | 8/2009 | Hilsebecher .......... | G01S 13/347 342/109 |
| 2010/0033364 | A1 | * | 2/2010 | Kishida ................. | G01S 13/345 342/70 |
| 2011/0181456 | A1 | * | 7/2011 | Luebbert ............... | G01S 13/343 342/70 |

(Continued)

FOREIGN PATENT DOCUMENTS

| | | |
|---|---|---|
| EP | 2500744 A1 | 9/2012 |
| WO | 2007148199 A2 | 12/2007 |

OTHER PUBLICATIONS

PCT Search Report, for PCT/US 2015/062466, dated Mar. 24, 2016.

*Primary Examiner* — Peter M Bythrow
(74) *Attorney, Agent, or Firm* — Lawrence J. Bassuk; Charles A. Brill; Frank D. Cimino

(57) ABSTRACT

Radar detection of an object is achieved by identifying a first range associated with a possible object based on a first return from a first radar transmission having a first chirp rate, and identifying a second range associated with the possible object based on a second return from a second radar transmission having a second chirp rate that differs from the first chirp rate. The first and second ranges are evaluated together to determine whether the possible object is a true object.

15 Claims, 2 Drawing Sheets

(56) References Cited

U.S. PATENT DOCUMENTS

2012/0235854 A1* 9/2012 Testar .................. G01S 7/35
  342/109
2014/0354470 A1* 12/2014 Kuo .................. G01S 7/35
  342/200

* cited by examiner

CONTROLLING RADAR TRANSMISSION TO ENABLE INTERFERENCE MITIGATION

FIELD

The present work relates generally to radar apparatus and, more particularly, to mitigation of interference in the radar return.

BACKGROUND

Radar has many and varied uses. As an example, frequency modulated continuous wave (FMCW) radar is useful in automotive and industrial applications, among others. The sensitivity of the radar is normally an important feature. Sensitivity refers to the ability of the radar reliably to detect objects that produce a weak radar return. However, the higher the sensitivity of the radar receiver, the more susceptible it is to interference. For example, a spur resulting from a modulation of the power supply can potentially be detected as a true object, resulting in a false alarm. Prior art approaches to mitigating the effects of spurs typically employ external spur mitigation schemes, for example, dithering the power supply.

It is desirable in view of the foregoing to provide for a high sensitivity radar with integrated interference mitigation.

DETAILED DESCRIPTION

The present work provides radar with integrated interference mitigation that identifies interferers (e.g., spurs such as mentioned above) in the spectrum of the radar return, and prevents them from being detected as true objects. It is particularly useful in identifying multiplicative spurs such as those arising from power source ripple on the power amplifier (PA) supply, or other interferers to the PA. It is also applicable to additive spurs and other interferers. According to example embodiments of the present work, first and second radar transmissions have first and second chirp rates, respectively, that differ from one another. First and second ranges associated with a possible object are identified based respectively on first and second returns from the first and second radar transmissions, respectively. The first and second ranges are evaluated together to determine whether the possible object is a true object.

Some embodiments transmit two consecutive radar transmission frames that have slightly different chirp rates (also referred to herein as chirp slopes). This permits identification of a spur or other interferer, because the spur or other interferer will occupy different locations (i.e., appear at different ranges), respectively, in the corresponding return frames. This is in contrast to a true object, which will appear at the same range location in both return frames. The range locations of possible objects detected in the two return frames are compared across the frames, in order to identify and remove interferers that might otherwise be falsely identified as true objects. In some embodiments, the chirp duration in one of the transmission frames is selected such that the transmission frame provides the same range resolution as the other transmission frame.

Consider as an interferer example, a multiplicative spur at frequency fs from the carrier, due to an aggressor object at range da. The radar return associated with the spur will exhibit the frequency $$fa\_spur=(S)(2)(da)/c+fs,$$

where S is the chirp slope and c is the speed of light, whereas the radar return of a true object at range db will exhibit the frequency $$fb=(S)(2)(db)/c.$$

Multiplying the above frequencies by c/2S yields their equivalent range estimates, that is:

$$fa\_spur =\!> da+(fs)(c)/2S$$

$$fb =\!> db.$$

The estimated range of a multiplicative spur thus depends on the chirp slope S, while the estimated range of a true object is independent of the chirp slope S. The technique also works for additive spurs, in which case da=0 in the above equations.

Figure 1:
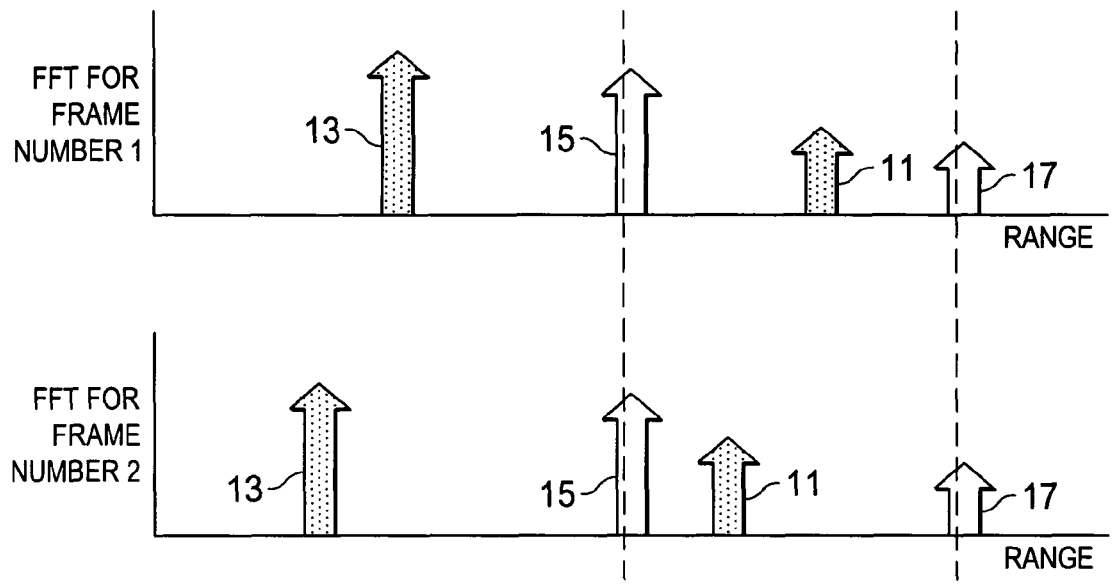
FIGS. 1 and 2 graphically illustrate concepts in accordance with the present work.

FIG. 1 illustrates the concepts described above. FFT v. range plots are shown for two consecutive radar return frames, designated as frame 1 and frame 2, that respectively correspond to two radar transmit frames that have been transmitted consecutively and have slightly different chirp slopes. Note that each of the radar transmission frames described herein may contain one or more chirps with identical chirp slopes. The peaks shown at 11 and 13 are caused by interferers, and the peaks shown at 15 and 17 are caused by true objects. Each of the peaks 11 and 13 appears at a different range location in frame 1 than in frame 2, whereas each of the peaks 15 and 17 appears at the same range location in both frame 1 and frame 2. The interferer peaks 11 and 13 may thus be distinguished from the true object peaks 15 and 17 by comparing the range values of the peaks detected in frame 1 with the range values of the peaks detected in frame 2. Any range value match corresponds to a true object.

Figure 2:
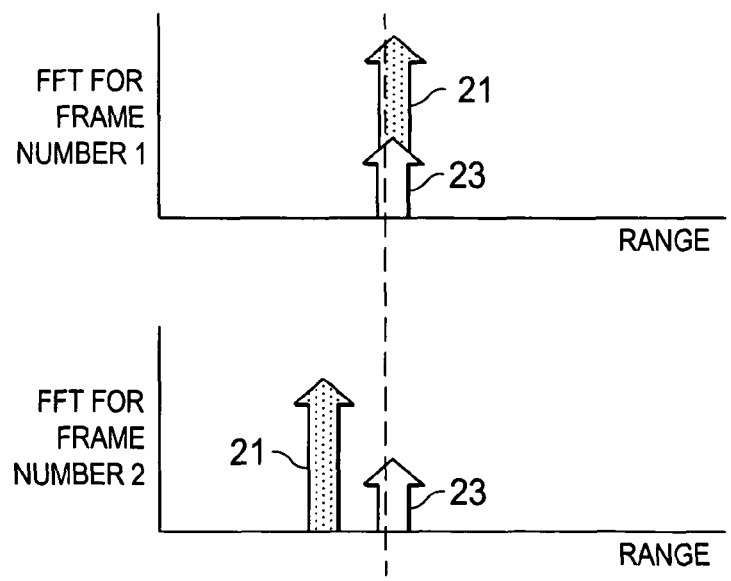

The present work guarantees interference-free detection of a true object peak in at least one of frame 1 and frame 2, because an interferer peak and a true object peak cannot coincide (i.e., appear at the same range) in both frames. This is shown in FIG. 2, wherein interferer peak 21 coincides in range with true object peak 23 in frame 1, but is range-shifted relative to true object peak 23 in frame 2. Again, a range match of peaks in frame 1 and frame 2 corresponds to a true object.

At the transmitter, consider an example wherein: the chirp duration is Tc; the chirp slope of the transmit frame associated with return frame 1 is S1; the chirp slope of the transmit frame associated with return frame 2 is S2; and the chirp slopes S1 and S2 are related by a factor α, such that S2=αS1. If the range resolution is kept constant across the two frames, such that the chirp durations of the transmit frames respectively associated with return frame 1 and return frame 2 are Tc and Tc/α, respectively, then, for a given spur (interferer) frequency fs, the number of range bins by which the interferer peak is displaced in frame 2 relative to frame 1 is:

$$\Delta \text{range\_idx} = T_c f_s \left(1 - \frac{1}{\alpha}\right)$$

A range bin is defined as the range resolution of the radar and given by $c/[2(S)(T_c)]$, where S and Tc are the chirp slope and chirp duration, respectively. Note also that a true object peak that coincides with an interferer peak in frame 1 will be separated from the interferer peak in frame 2 by $\Delta f$ Hz, where $$\Delta f = f_s(1-\alpha)$$

Consider, for example, a spur at 1.5 MHz. In some embodiments, Tc=125 us (example of a higher resolution chirp), and $\alpha$=0.9, yielding $\Delta$range_idx=21 and $\Delta f$=0.15 MHz. In some embodiments, Tc=30 us (example of a lower resolution chirp), and $\alpha$=0.85, yielding $\Delta$range_idx=8 and $\Delta f$=0.225 MHz.

Figure 3:
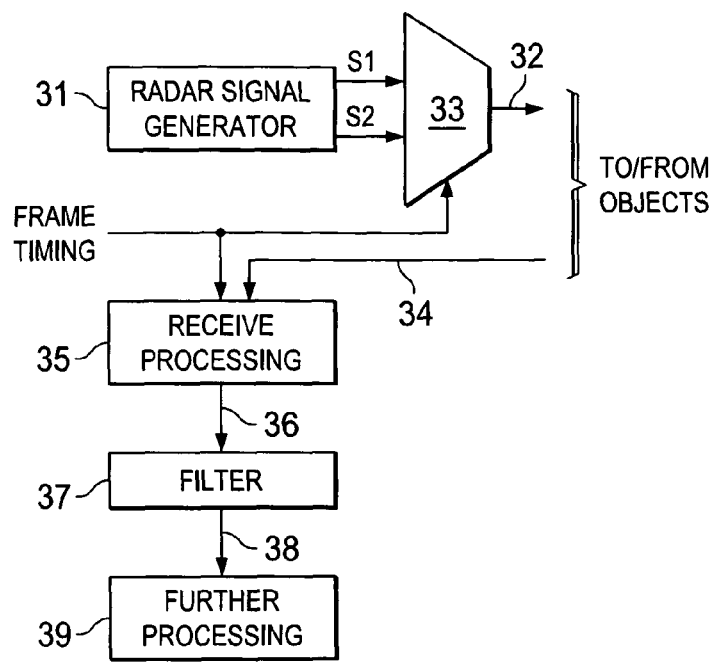
FIG. 3 diagrammatically illustrates a radar apparatus according to example embodiments of the present work.

FIG. 3 diagrammatically illustrates a radar apparatus according to example embodiments of the present work. In some embodiments, the apparatus is a FMCW radar apparatus. A radar signal generator 31 produces two radar transmit signals having respective chirp slopes S1 and S2. A selector 33 selects between the two transmit signals in accordance with the frame timing, such that two consecutive frames transmitted at 32 have respective chirp slopes S1 and S2.

A receiver 35 receives at 34 return frames associated with the frames transmitted at 32. The receiver 35 performs conventional radar receive processing (including FFT processing as indicated in FIGS. 1 and 2) on two consecutive return frames (see also frame 1 and frame 2 in FIGS. 1 and 2) that correspond respectively to two frames that have been consecutively transmitted at 32 with different chirp slopes. The receive processing results produced by the receiver 35 include detected peaks at range locations in frame 1 and frame 2 (see also FIGS. 1 and 2). The receive processing results are passed at 36 to a filter 37 that compares the range values of the detected peaks, across frame 1 and frame 2. Based on the comparison, the filter 37 distinguishes interferers from true objects and eliminates the interferers. The receive processing results associated with the identified true objects may then be passed on at 38 for further conventional processing (shown generally at 39).

Figure 4:
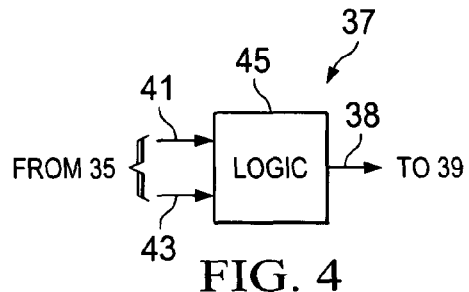
FIG. 4 diagrammatically illustrates a portion of the apparatus of FIG. 3 in more detail according to example embodiments of the present work.

FIG. 4 diagrammatically illustrates the filter 37 of FIG. 3 in more detail according to example embodiments of the present work. Receive processing results for frame 1 and frame 2 are provided by receiver 35, as shown generally at 41 and 43. Logic 45 implements a match detection function that compares the range values of peaks in frame 1 with the range values of peaks in frame 2, and identifies only comparison matches as true objects. The receive processing results associated with true objects may then be passed on at 38 for further processing at 39 (see also FIG. 3).

Figure 5:
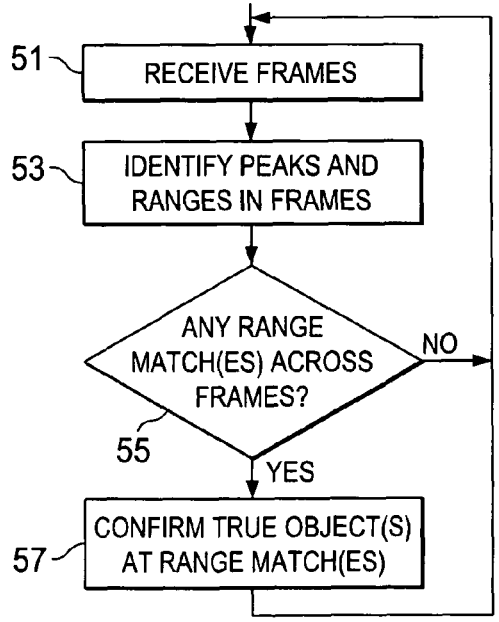
FIGS. 5 and 6 illustrate operations according to example embodiments of the present work.

FIG. 5 illustrates operations that may be performed according to example embodiments of the present work. In some embodiments, the apparatus described above relative to FIGS. 3 and 4 is capable of performing the operations shown in FIG. 5. At 51, consecutive return frames are received. At 53, any peaks and their respectively corresponding ranges are identified (see also FIGS. 1 and 2), for both of the return frames. At 55, it is determined whether there are any range matches across the two frames. If not, then no true objects have been identified, and operations return to 51. If there are range matches across the two frames at 55, then these matches are confirmed as true objects at 57, and operations return to 51.

Figure 6:
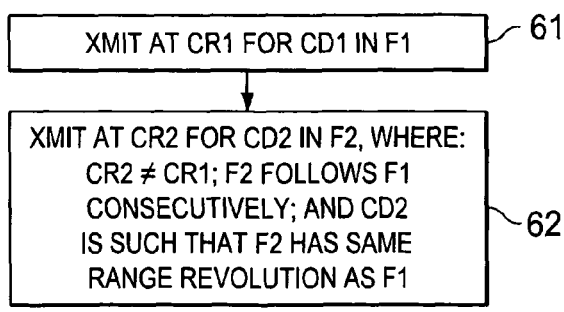

FIG. 6 illustrates further operations that may be performed according to example embodiments of the present work. In some embodiments, the apparatus described above relative to FIG. 3 is capable of performing the operations shown in FIG. 6. At 61, there is radar transmission (designated by XMIT) at a first chirp rate (CR1) for a first chirp duration (CD1) in a first frame (F1). Thereafter, at 62, there is radar transmission at a second chirp rate (CR2) for a second chirp duration (CD2) in a second frame (F2), where: the second chirp rate differs from the first chirp rate; the second frame follows consecutively after the first frame; and the second chirp duration is selected such that the second frame has the same range resolution as the first frame.

Referring again to the situation depicted in FIG. 2 wherein a true object peak 23 and an interferer peak 21 coincide in one of the frames, it may be often required (for further processing) to determine the amplitude (and/or phase) of the true object peak 23. The range value for the peak 23 may be discerned as described above and, if the amplitudes (and/or phases) of the peaks at that range value differ significantly between the two frames (as shown in FIG. 2), one can infer that there is a coinciding interferer in one of the frames. Such detection of a significant amplitude (and/or phase) difference (e.g., beyond a predetermined threshold) between peaks at the same range may be performed, for example, by the logic 45 of FIG. 4. However, it is not clear at the outset which of the two frames presents an interference-free view of the true object peak 23. Hence, determining the amplitude (and/or phase) of the true object peak 23 will require further processing. Various embodiments use various techniques to make this determination. Two examples are now described.

Some embodiments exploit the fact that the frame which presents an "interference-free" view of the true object peak 23 will contain an additional peak that corresponds to the interferer. This is peak 21 in the frame 2 FFT plot of FIG. 2. This additional peak 21 is of course not separately detectable in the frame 1 FFT plot where the interferer peak 21 and the true object peak 23 coincide. By simply determining which of the frames contains the additional peak (frame 2 in the FIG. 2 example), the frame that presents an interference-free view of the true object peak 23 (frame 1 in the FIG. 2 example) may be identified. The true amplitude (and/or phase) of the true object peak 23 may therefore be determined by inspecting the peak 23 in frame 1. The above-described analysis may be performed, for example, by the logic 45 of FIG. 4.

In some embodiments, if the logic 45 determines that a true object peak coincides with an interfere peak in one of the two return frames, the logic 45 signals the radar signal generator (see 31 in FIG. 3) to transmit a third frame with a chirp slope that differs from the chirp slopes of the frame transmissions corresponding to frame 1 and frame 2. Interference-free viewing of the true object peak is guaranteed in the spectrum of at least two of the three return frames corresponding to the three frame transmissions. That is, in at least two of the three return frames, the amplitude (and/or phase) of the true object peak will be approximately equal (e.g., within a specified threshold that accounts for variations due to noise). This will correspond to the true amplitude (and/or phase) of the true object peak. A suitable three-way comparison between the amplitude (and/or phase) of the three peaks at the identified range of the true object may be performed, for example, by the logic 45 of FIG. 4.

The present work as described above provides various advantages, some examples of which are: no external spur mitigation technique is needed; effective even if spurs are dynamically changing; performance is independent of the number of chirps in a frame (e.g., effective even in industrial scenarios with only one chirp per frame); requires no change in intra-frame 2D FFT processing associated with conventional radar receiver apparatus; only a modest percentage difference is needed between chirp slopes in consecutive frames (e.g., an α parameter around 0.9); effective for both multiplicative and additive spurs, and for other interferers; and effective even for non-zero velocity objects.

Although example embodiments of the present work have been described above in detail, this does not limit the scope of the work, which can be practiced in a variety of embodiments.

What is claimed is:

1. A method for frequency modulated continuous wave radar detection of an object, comprising:
   transmitting consecutively a first radar frame and a second radar frame at different chirp slopes and the same range resolutions;
   receiving a first return frame from the first radar frame and a second return frame from the second radar frame;
   determining peaks and ranges of the peaks in the first and second return frames;
   comparing the ranges of the peaks in the first return frame to the ranges of the peaks in the second return frame to determine any match of ranges for any peaks; and
   confirming a true object by peaks with matching ranges.

2. The method of claim 1, in which the different chirp slopes are related by a factor α=0.9.

3. The method of claim 2, in which the different chirp slopes are related by a factor α=0.85.

4. The method of claim 1, including determining interferers with peaks at ranges that do not match between the first return frame and the second return frame.

5. The method of claim 1 in which the different chirp slopes are related by a factor α of about 0.9 to 0.85.

6. The method of claim 1 including:
   determining interferers with peaks at ranges that do not match between the first return frame and the second return frame; and
   including determining an amplitude of a peak of a true object by comparing amplitudes of the peaks of the true object and peaks of the interferers.

7. An apparatus for frequency modulated continuous wave radar detection of an object, comprising:
   a transmitter transmitting consecutively a first radar frame and a second radar frame at different chirp slopes and the same range resolutions;
   a receiver receiving a first return frame from the first radar frame and a second return frame from the second radar frame; and
   logic coupled to said receiver and configured for evaluating the first and second frames together to determine whether the possible object is a true object, the logic determining peaks and ranges of the peaks in the first and second return frames, comparing the ranges of the peaks in the first return frame to the ranges of the peaks in the second return frame to determine any match of ranges for any peaks, and confirming a true object by peaks with matching ranges.

8. The apparatus of claim 7, in which the different chirp slopes are related by a factor α=0.9.

9. The apparatus of claim 8, in which the different chirp slopes are related by a factor α=0.85.

10. The apparatus of claim 7, including determining interferers with peaks at ranges that do not match between the first return frame and the second return frame.

11. The apparatus of claim 7 in which the different chirp slopes are related by a factor α of about 0.9 to 0.85.

12. The apparatus of claim 7 in which the logic determines interferers with peaks at ranges that do not match between the first return frame and the second return frame; and determines an amplitude of a peak of a true object by comparing amplitudes of the peaks of the true object and peaks of the interferers.

13. A process of identifying power supply interferers and true objects in a frequency modulated continuous wave radar system, comprising:
   (a) transmitting consecutively a first radar frame and a second radar frame at different chirp slopes and the same range resolutions;
   (b) receiving a first return frame from the first radar frame and a second return frame from the second radar frame;
   (c) determining peaks, and ranges of the peaks, in the first and second return frames;
   (d) comparing the ranges of the peaks in the first return frame to the ranges of the peaks in the second return frame to determine any match of ranges for any peaks;
   (e) confirming interferer peaks by peaks with different ranges in the first and second return frames; and
   (f) confirming a true object by peaks with matching ranges in the first and second return frames.

14. The process of claim 13 including determining an amplitude of a peak of a true object by comparing amplitudes of the peaks of the true object and peaks of the interferers.

15. The process of claim 13 in which the different chirp slopes are related by a factor α of about 0.9 to 0.85.

* * * * *